United States Patent
Nakamura

(10) Patent No.: US 10,516,808 B2
(45) Date of Patent: Dec. 24, 2019

(54) SCANNER, METHOD OF PRODUCING SCAN DATA, AND SCAN CONTROL PROGRAM

(71) Applicant: SEIKO EPSON CORPORATION, Tokyo (JP)

(72) Inventor: Tomohiro Nakamura, Nagano (JP)

(73) Assignee: Seiko Epson Corporation, Tokyo (JP)

(\*) Notice: Subject to any disclaimer, the term of this patent is extended or adjusted under 35 U.S.C. 154(b) by 0 days.

(21) Appl. No.: 16/128,557

(22) Filed: Sep. 12, 2018

(65) Prior Publication Data

US 2019/0082078 A1 Mar. 14, 2019

(30) Foreign Application Priority Data

Sep. 14, 2017 (JP) ................................. 2017-176456

(51) Int. Cl.
*H04N 1/60* (2006.01)
*H04N 1/409* (2006.01)
*H04N 1/58* (2006.01)

(52) U.S. Cl.
CPC ......... *H04N 1/6005* (2013.01); *H04N 1/4092* (2013.01); *H04N 1/4097* (2013.01); *H04N 1/58* (2013.01)

(58) Field of Classification Search
CPC ...................................................... H04N 1/6005
USPC ....................................................... 358/1.15
See application file for complete search history.

(56) References Cited

U.S. PATENT DOCUMENTS

| | | | |
|---|---|---|---|
| 2003/0068084 A1* | 4/2003 | Kinjo ...................... | H04N 1/62 382/164 |
| 2015/0356344 A1* | 12/2015 | Yamanashi ........ | G06K 9/00221 382/103 |

FOREIGN PATENT DOCUMENTS

| JP | 2010-166442 A | 7/2010 |
|---|---|---|
| JP | 2010166442 A * | 7/2010 |

\* cited by examiner

*Primary Examiner* — Jacky X Zheng
(74) *Attorney, Agent, or Firm* — Global IP Counselors, LLP

(57) ABSTRACT

A scanner reads an original and generates a read image, specifies a first region having a pattern on a wrinkle and a second region having a wrinkle and no pattern from the read image, and performs a wrinkle reduction process in which the wrinkle is not reduced in the first region and the wrinkle is reduced in the second region, included in the read image.

8 Claims, 8 Drawing Sheets

SCANNER, METHOD OF PRODUCING SCAN DATA, AND SCAN CONTROL PROGRAM

BACKGROUND

1. Technical Field

The present invention relates to a scanner, a method of producing scan data, and a scan control program.

2. Related Art

An existing technique of correcting a read image obtained by reading an original in which wrinkles have occurred has been known. For example, JP-A-2010-166442 discloses a technique of correcting a brightness value of a pixel determined to be included in a wrinkle region using a background brightness value.

In a case where the original in which the wrinkles occur is read, brightness and darkness are generated in the wrinkle portion. However, when a correction such as being uniformly darkened is performed so as to eliminate the brightness and darkness, an object such as a faint character contained in the wrinkle portion becomes illegible in some cases.

SUMMARY

A scanner includes a reading section for reading an original and generating a read image, an extraction section for extracting a first region having a pattern on a wrinkle and a second region having a wrinkle and no pattern from the read image, and a processing section for performing a wrinkle reduction process in which the wrinkle is not reduced in the first region and the wrinkle is reduced in the second region. According to this configuration, it is possible to reduce variations in brightness and darkness due to the wrinkle without erasing the pattern.

Further, it is preferable that a configuration be such that the wrinkle reduction process is a process for performing a correction on only a portion having a higher luminance than that of a ground color of the original in the second region to be dark. According to this configuration, it is possible to perform the correction to reduce the wrinkle without erasing the pattern.

Further, it is preferable that a configuration be such that the processing section acquires the ground color based on a statistical value of a luminance histogram of the read image in a region having a higher luminance than a specific luminance. According to this configuration, when a dark large region is included in the original, it is possible to prevent the region from being erroneously recognized as being the ground color.

Further, it is preferable that a configuration be such that the processing section, in the portion having the higher luminance than that of the ground color, performs a first luminance correction in which a luminance after the correction is changed from the luminance of the ground color to a saturation luminance which is lower than the luminance of the ground color with an increase in a luminance before the correction with respect to a pixel belonging to a first luminance range including the ground color, and performs a second luminance correction in which the luminance after the correction is changed to the saturation luminance irrespective of the luminance before the correction with respect to a pixel belonging to a second luminance range which is adjacent to a high luminance side of the first luminance range. According to this configuration, it is possible to reduce an effect of the wrinkle without erasing the pattern.

Further, it is preferable that a configuration be such that the processing section widens, in a case where a luminance is distributed in a wide range in a luminance range having the higher luminance than that of the ground color, the first luminance range in comparison with a case where the luminance is distributed in a narrow range. According to this configuration, it is possible to adjust the intensity of the correction according to the degree of effect of the wrinkle.

Further, it is preferable that a configuration be such that the processing section gradually changes a reduction amount of the wrinkle at a boundary between the first region and the second region. According to this configuration, it is possible to make the effect of the correction inconspicuous.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention will be described in accordance with the following order.
1. Configuration of Scanner:
2. Wrinkle Reduction Process:
3. Other Embodiments:

1. Configuration of Scanner

Figure 1:
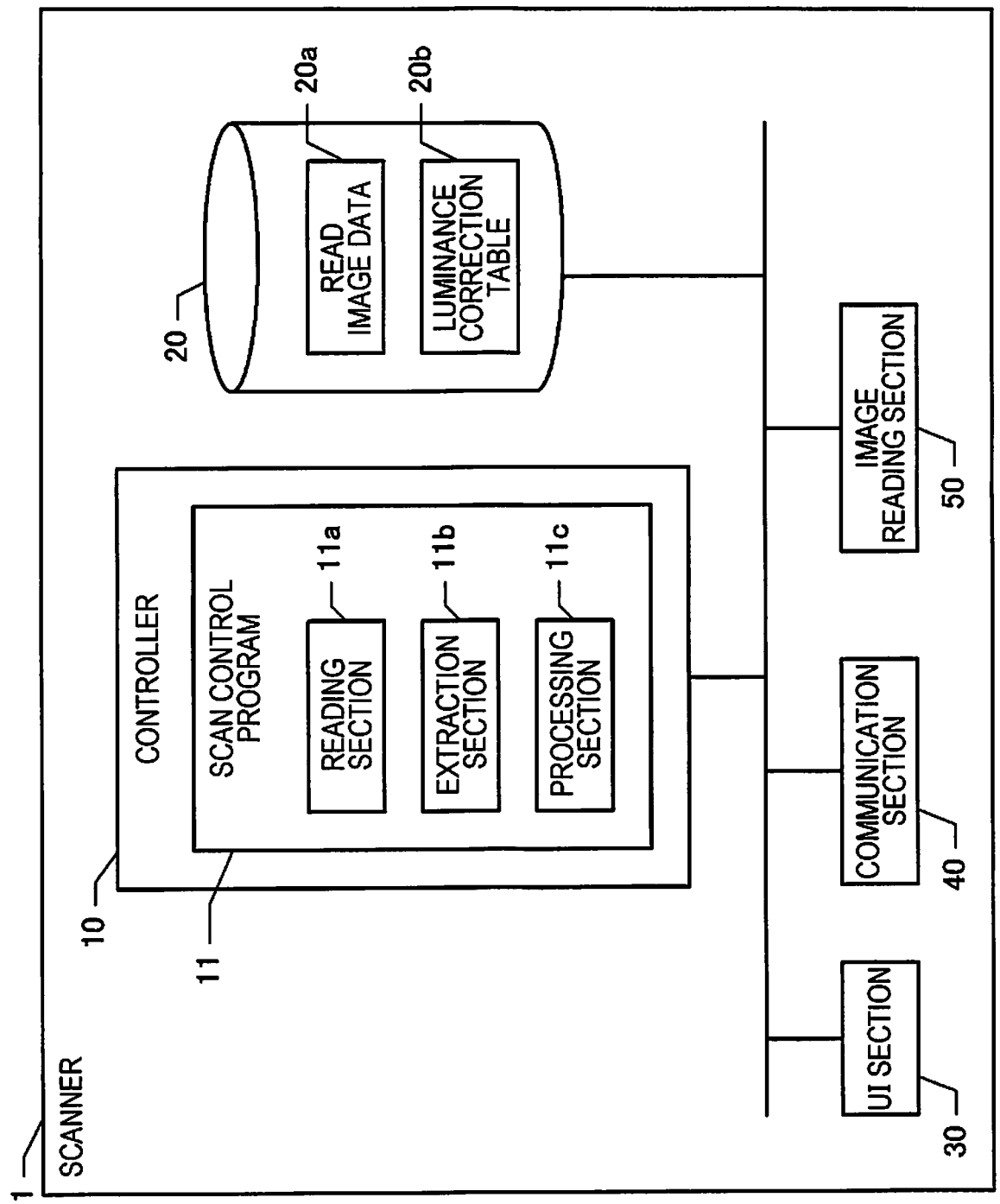
FIG. 1 is a block diagram of a scanner.

FIG. 1 is a block diagram illustrating a configuration of a scanner 1 functioning as an image processing apparatus according to an embodiment of the invention. The scanner 1 includes a controller 10, a memory 20, a UI (User Interface) section 30, a communication section 40, and an image reading section 50.

The UI section 30 includes a touch panel type display and a key input section. The display includes a display panel and a touch detection panel overlaid on the display panel. The display displays various types of information on the display panel under the control of the controller 10. Also, the display detects contact by a finger or the like of a person with respect to the touch detection panel and outputs contact coordinates to the controller 10. When the key input section detects an operation on a key such as a power button, a start button, a cancel button, or a numeric button, or the like, the key input section outputs key operation information indicating the key that is operated to the controller 10.

The communication section 40 includes a removable memory and a communication interface circuit for communicating with an external device in accordance with various communication protocols. The image reading section 50 includes a well-known color image sensor which emits light on an original, receives reflected light from the original, and uses the received light as read data, a light source, an original platen, a mechanical component, and the like. In the embodiment, the image reading section 50 reads an image as data indicating gray scales of respective color channels of R (red), G (green), and B (blue).

The controller 10 acquires the data from the image reading section 50 and records the data as read image data 20a in the memory 20. In the memory 20, arbitrary data can be recorded, and in the embodiment, a luminance correction table 20b used for a wrinkle reduction process is also recorded.

The controller 10 can acquire an operation content of the user based on the information acquired from the UI section 30, and can execute a process corresponding to the operation content. The process executable by the controller 10 includes various processes, for example, includes an instruction of reading by the image reading section 50, an instruction of reading accompanied by the wrinkle reduction process, an instruction of transmitting the read image to the removable memory or the external device, and the like. The scanner 1 may be controlled by an external device (e.g., another computer, a portable terminal, or the like) connected to the scanner 1, of course.

The controller 10 includes a processor (e.g., a CPU, an ASIC, or a combination thereof), a RAM, or the like, and executes various programs recorded in the memory 20 to achieve various functions of the scanner 1. The various programs executed by the controller 10 include a scan control program 11 for causing the controller 10 to achieve a function of executing the wrinkle reduction process on the read image read by the image reading section 50.

The scan control program 11 includes a reading section 11a, an extraction section 11b, and a processing section 11c. The reading section 11a is a program module that causes the controller 10 to execute a function of reading the original and generating the read image. In other words, the controller 10 controls the image reading section 50 by the function of the reading section 11a, reads the original placed on the original platen of the scanner 1, and acquires the read image. The acquired read image is recorded as the read image data 20a in the memory 20.

The extraction section 11b is a program module that causes the controller 10 to execute a function of extracting a first region having a pattern on a wrinkle and a second region having the wrinkle and no pattern from the read image. Further, the processing section 11c is a program module that causes the controller 10 to execute a function of performing the wrinkle reduction process that does not reduce the wrinkle in the first region and reduces the wrinkle in the second region.

Figure 2:
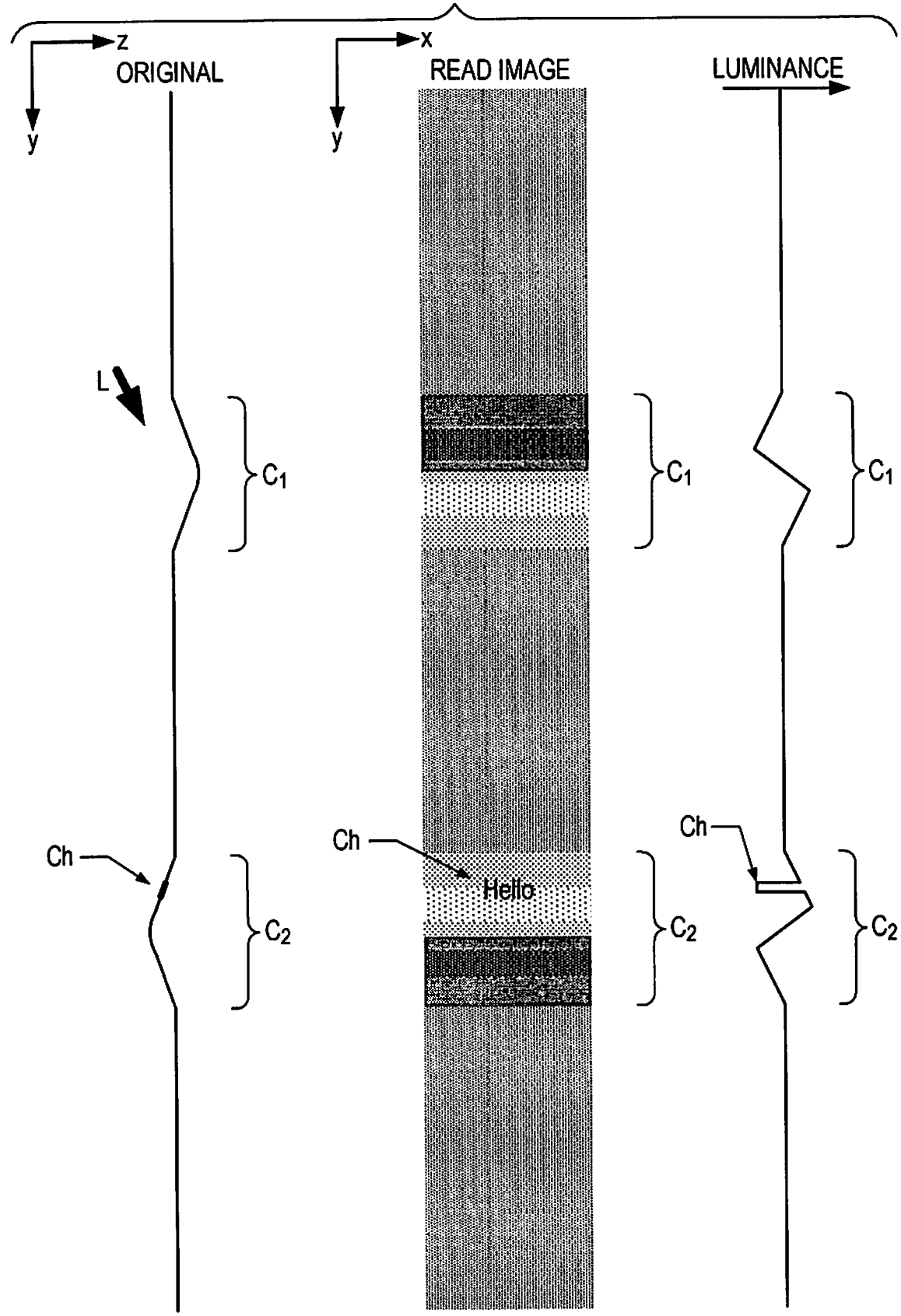
FIG. 2 is a diagram schematically illustrating reading of an original in a state where wrinkles are generated.

The wrinkle is formed by the original having unevenness in a direction perpendicular to the original platen on the original platen, and appears, in the read image, as a portion brighter than the ground color and a portion darker than the ground color adjacent to the portion. FIG. 2 is a diagram schematically illustrating reading of the original in a state where the wrinkle is generated. In FIG. 2, the state of the original, the read image of the original, and the luminance of the read image are arranged and illustrated in this order from the left. In addition, it is assumed here that the original platen is parallel to an x-y plane, an x direction is a main scanning direction, and a y direction is a sub scanning direction. Therefore, the wrinkle of the original is generated as unevenness in a z direction perpendicular to the x-y plane. FIG. 2 illustrates an example in which a wrinkle $C_1$ is generated in the positive direction of a z-axis and a wrinkle $C_2$ is generated in the negative direction of the z-axis.

In the example illustrated in FIG. 2, the light source is directed in the positive direction of the z-axis and in the positive direction of a y-axis, and an optical axis of light L from the light source is inclined to the x-y plane. Although the light from the light source is reflected or scattered by the original and is read by a sensor (not illustrated), the angle between the original surface and the optical axis differs between the region where the wrinkle is generated and the region where the wrinkle is not generated. Therefore, even in the same color portion of the original, the image is read as having different colors (mainly luminance) between the region where the wrinkle is generated and the region where the wrinkle is not generated.

Specifically, when an intersection angle between the direction of the optical axis and the original surface becomes larger due to the wrinkle, the luminance becomes higher, and when the intersection angle between the direction of the optical axis and the original surface becomes smaller due to the wrinkle, the luminance becomes lower. The read image and the luminance illustrated in FIG. 2 schematically indicate that such brightness and darkness are generated. In other words, in the wrinkle $C_1$, since the original is convex in the positive direction of the z-axis, the intersection angle between the direction of the optical axis and the original surface decreases due to the wrinkle along with a movement in the positive direction of the y-axis, and then the intersection angle between the direction of the optical axis and the original surface increases due to the wrinkle. As a result, in the read image illustrated in FIG. 2, the luminance gradually becomes lower than that of the ground color along with the movement in the positive direction of the y-axis at the portion of the wrinkle $C_1$, then temporarily becomes high, and thereafter, the luminance gradually changes toward the luminance of the ground color.

In the wrinkle $C_2$, since the original is convex in the negative direction of the z-axis, the intersection angle between the direction of the optical axis and the original surface increases due to the wrinkle along with the movement in the positive direction of the y-axis, and then the intersection angle between the direction of the optical axis and the original surface decreases due to the wrinkle. As a result, in the read image illustrated in FIG. 2, the luminance gradually becomes higher than that of the ground color along with the movement in the positive direction of the y-axis at the portion of the wrinkle $C_2$, then temporarily becomes low, and thereafter, the luminance gradually changes toward the luminance of the ground color.

Note that, in the example illustrated in FIG. 2, characters Ch (characters of "Hello") are printed on a portion where the intersection angle between the direction of the optical axis and the original surface are increased due to the wrinkle $C_2$. Accordingly, in the read image, the character is included in the bright portion, and the luminance of the portion of the character is lower than that of the surrounding portion in the luminance of the portion of the wrinkle $C_2$. In the read image of FIG. 2, the characters of Hello are emphasized, but it is assumed here that the character Ch includes faint characters (high luminance characters). In other words, as illustrated in FIG. 2, although the luminance of the portion of the character included in the wrinkle $C_2$ is low, the value itself of the luminance is a value that is not so different from that of the surrounding ground color.

As described above, since the brightness and darkness are generated in the read image by the occurrence of the wrinkle, the wrinkle is removed by correcting the bright portion caused by the wrinkle to be dark. However, when a character is printed on the wrinkle, since the portion of the character becomes dark as described above, if the bright portion is uniformly darkened, the character becomes illegible. Additionally, in a case where the wrinkle is generated, it is generally difficult to determine whether the dark portion is in a dark state because of the wrinkle or is dark by the character. On the other hand, in a case where the wrinkle is generated, it is possible to consider the portion brighter than the ground color as the wrinkle in most cases.

In view of this, in the embodiment, the controller 10 performs the wrinkle reduction process by performing a process for correcting only a portion having a higher luminance than that of the ground color of the original to be dark in a region having the wrinkle and no pattern. According to this configuration, it is possible to perform the wrinkle reduction process without assimilating the pattern such as the character or the like into the ground color.

Note that, in the embodiment, the controller 10 distinguishes between the first region and the second region based on a gradient of the read image. In other words, the controller 10 acquires the read image data 20a and specifies the gradient of the read image for each pixel. Then, the controller 10 regards a region having a gradient equal to or larger than a first threshold value as the first region, and does not apply the wrinkle reduction process to the region. In addition, the controller 10 regards a region having a gradient equal to or smaller than a second threshold value as the second region, and applies the wrinkle reduction process to the region. Further, the controller 10 regards a region having a gradient larger than the second threshold value and smaller than the first threshold value as a boundary between the first region and the second region, and gradually changes the reduction amount of the wrinkle. According to the above configuration, it is possible to reduce variations in the brightness and darkness due to the wrinkle without erasing the pattern, and furthermore, to make the influence of the correction inconspicuous.

2. Wrinkle Reduction Process

Figure 3:
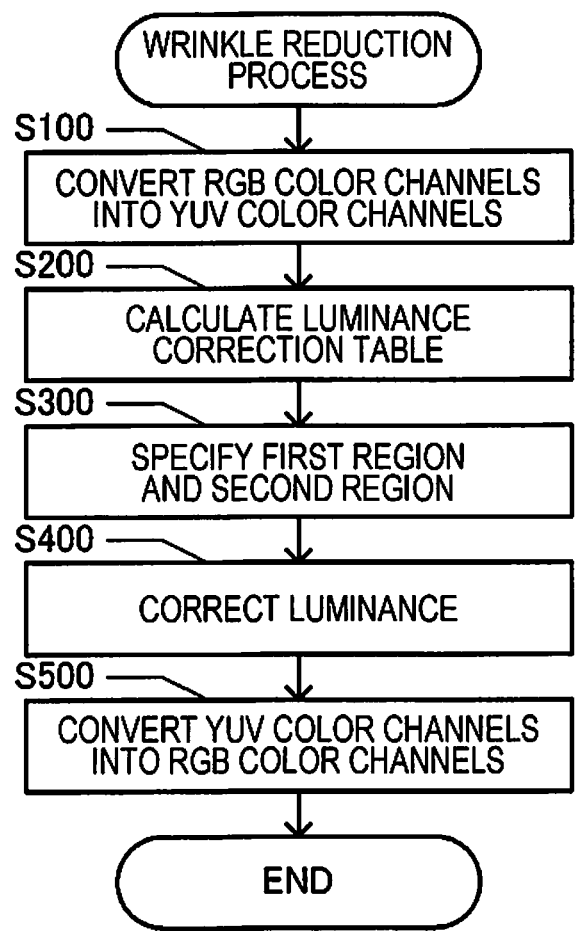
FIG. 3 is a flowchart showing a wrinkle reduction process.

Next, the wrinkle reduction process in the above-described configuration will be described in detail. FIG. 3 is a flowchart showing the wrinkle reduction process. For example, when a user instructs to perform reading accompanied by the wrinkle reduction process by operating the UI section 30, the wrinkle reduction process is started in a state in which the controller 10 reads the original by the function of the reading section 11a, and the read image data 20a are recorded in the memory 20.

When the wrinkle reduction process is started, the controller 10 converts RGB color channels of the read image into YUV color channels by the function of the extraction section 11b (Step S100). In other words, the controller 10 acquires the read image data 20a from the memory 20 and converts the color space representing the color of each pixel. It is sufficient that the conversion of the RGB color channels into the YUV color channels is performed using various techniques, and for example, the conversion can be performed by the following formulas or the like.

$$Y=(R+2\times G+B+2)/4$$

$$U=(B-G+1)/2+127$$

$$Y=(R-G+1)/2+127$$

Here, R is a gray scale value of a red channel, G is a gray scale value of a green channel, B is a gray scale value of a blue channel, and Y is a luminance.

Next, the controller 10 calculates the luminance correction table by the function of the processing section 11c (Step S200). Here, the luminance correction table is a conversion table for correcting only a portion having the higher luminance than that of the ground color of the original to be dark. In order to calculate the luminance correction table, the controller 10 first acquires the ground color of the original. Specifically, the controller 10 acquires a luminance histogram of the read image in the region having a higher luminance than a specific luminance. Here, the specific luminance is a luminance determined in advance so as not to erroneously detect the ground color, and is a luminance set to eliminate the dark portion such as the character.

That is, the ground color of the original is a background of an object such as the character, and generally has the luminance with a high frequency in the luminance histogram. However, if the dark objects such as the characters are printed on many portions of the original, the frequency of the pixels of the dark objects increases. Accordingly, if an analysis is performed such that the luminance with the high frequency is regarded as the ground color in the luminance histogram over the entire luminance range, there is a possibility that the ground color is erroneously detected.

Figure 4:
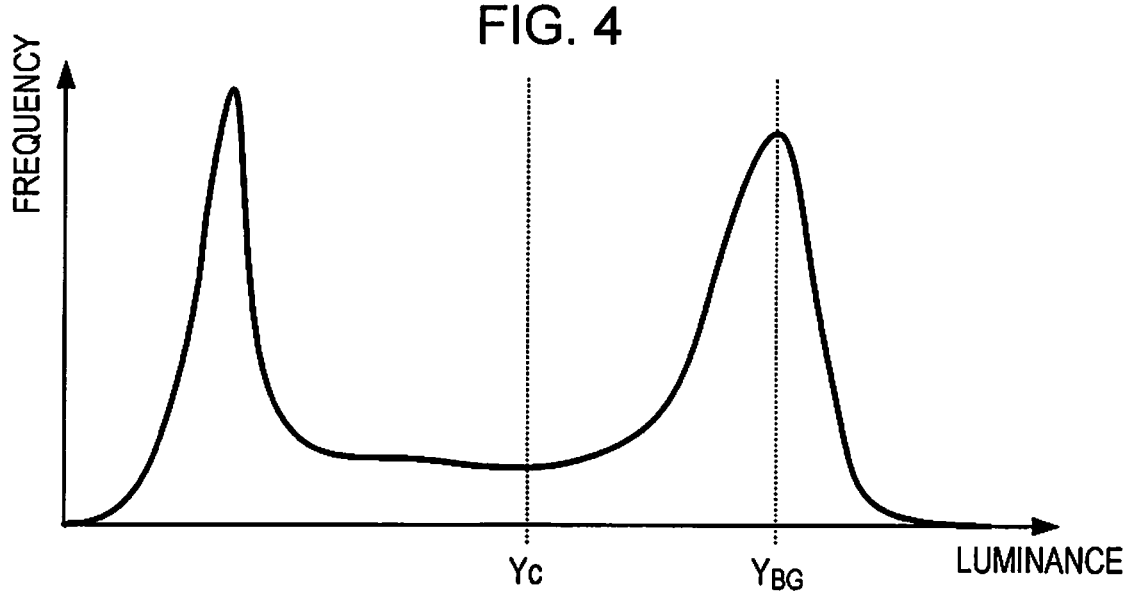
FIG. 4 is an example of a luminance histogram of a read image.

FIG. 4 is an example of the luminance histogram of the read image. In the luminance histogram illustrated in FIG. 4, a luminance distribution has two peaks in total on a high luminance side and a low luminance side. In such a luminance distribution, in many cases, the peak on the high luminance side corresponds to the luminance of the ground color of the original, and the peak on the low luminance side corresponds to the luminance of the object such as the character. Therefore, for example, the controller 10 sets a value Yc at the center of the luminance range as the specific luminance, and acquires the luminance histogram in at least a luminance range with the luminance equal to or higher than the specific luminance. Then, the controller 10 acquires a statistical value of the luminance histogram in the region having the higher luminance than the specific luminance, and acquires the luminance of which the frequency is statistically high as the ground color. In the embodiment, the mode is acquired as the ground color. In FIG. 4, the luminance which is the mode of the luminance and is regarded as the luminance of the ground color is illustrated as $Y_{BG}$.

When the luminance of the ground color is specified, the controller 10 calculates the luminance correction table for correcting the luminance of the pixel of a portion having the higher luminance than that of the ground color. Specifically, the controller 10 calculates a standard deviation Ys of the luminance in the range from the luminance of the ground color of the original to the maximum value of the luminance (255 in the embodiment) on the basis of formulas (1) to (3).

$$N = \sum_{Y=Y_{BG}}^{Y=255} n(Y) \quad (1)$$

$$Y_U = \frac{1}{N} \sum_{Y=Y_{BG}}^{Y=255} Y \times n(Y) \quad (2)$$

$$Y_V = \frac{1}{N} \sum_{Y=Y_{BG}}^{Y=255} (Y - Y_U)^2 \times n(Y) \quad (3)$$

Here, Y is the luminance, N is the number of pixels, the luminance of each of the pixels being included in a range from the luminance of the ground color of the original to the maximum value of the luminance, and n(Y) is the luminance histogram. In addition, the luminance $Y_{BG}$ is the luminance of the ground color, $Y_U$ is the average luminance of the pixels, the luminance of each of the pixels being included in the range from the luminance of the ground color to the maximum value of the luminance, and $Y_V$ is luminance variance. Thus, the standard deviation Ys is $(Y_V)^{1/2}$.

When the standard deviation Ys is acquired, the controller 10 sets the range of the standard deviation Ys from the luminance $Y_{BG}$ of the ground color of the original on the higher luminance side as a first luminance range. Further, the controller 10 sets the luminance range from the upper limit value of the first luminance range to the maximum value of the luminance as a second luminance range. When the luminance range is set, the controller 10 calculates the luminance correction table by defining a conversion relationship of the luminance in each luminance range.

Figure 5:
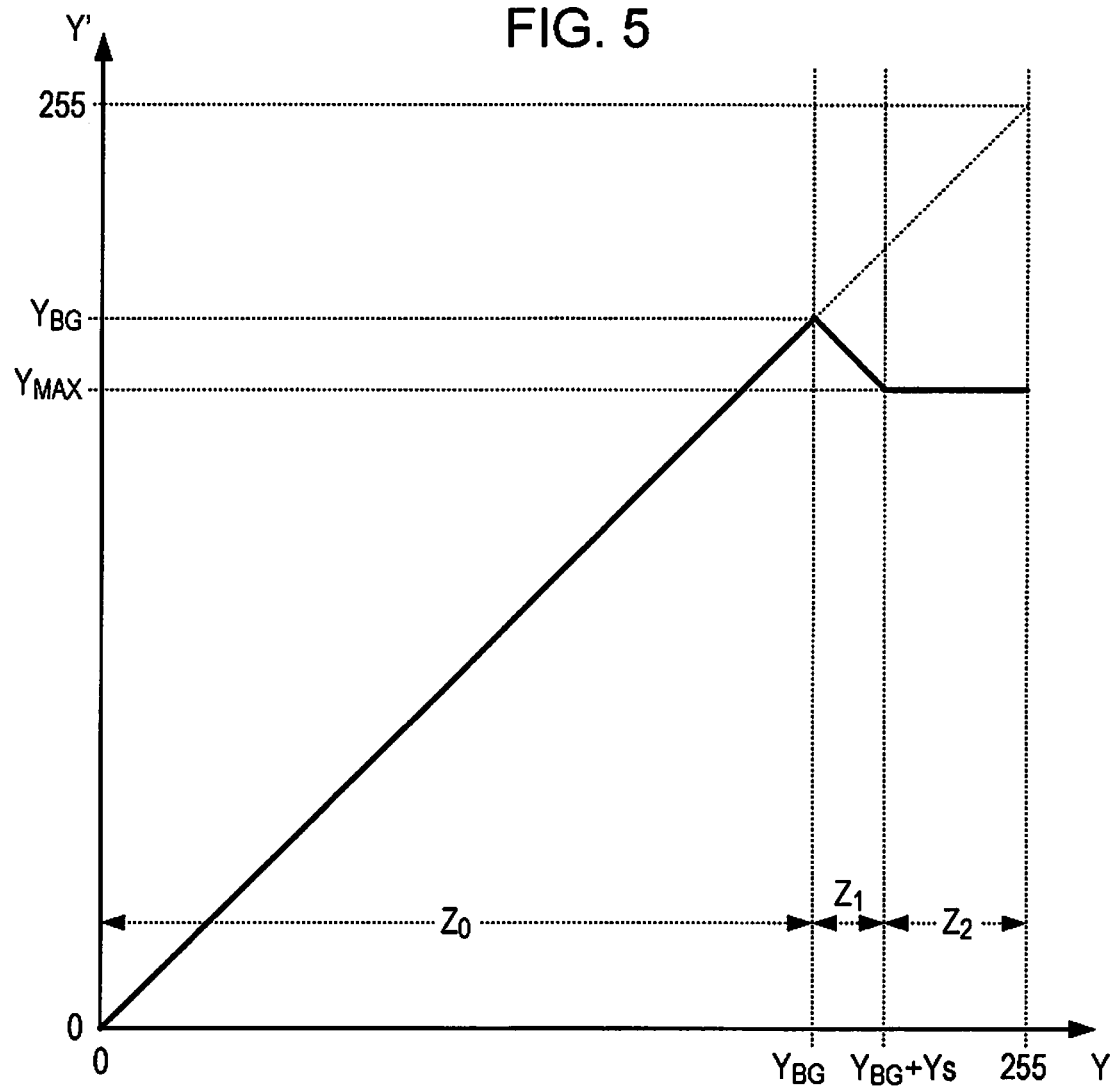
FIG. 5 is a diagram explaining a luminance correction table.

Specifically, the controller 10 calculates the luminance correction table in which the conversion is not performed in a luminance range with the luminance smaller than that of the first luminance range (the luminance values before and after the conversion are equal). FIG. 5 illustrates an example of the luminance correction table. In FIG. 5, a horizontal axis represents an input luminance Y before the conversion, a vertical axis represents an output luminance Y' after the conversion, and a conversion characteristic by the luminance correction table is illustrated using a thick solid line. In addition, in FIG. 5, a luminance range with the luminance smaller than that of the first luminance range is a range $Z_0$, and the input luminance Y and the output luminance Y' are equal to each other in the range $Z_0$ as illustrated by a straight line having an inclination of 1 in FIG. 5.

Further, the controller 10 calculates the luminance correction table so as to perform a first luminance correction, to the pixels belonging to the first luminance range, in which the luminance after the correction changes from the luminance $Y_{BG}$ of the ground color to a saturation luminance $Y_{MAX}$ which is lower than the luminance of the ground color with increase in the luminance before the correction. In the embodiment, as illustrated in FIG. 5, the luminance correction table having characteristics that the output luminance Y' linearly decreases from the luminance $Y_{BG}$ to $Y_{MAX}$ in a first luminance range $Z_1$ having the input luminance Y from the luminance $Y_{BG}$ to $Y_{BG}$+Ys is generated. Note that, in the embodiment, the inclination of input/output characteristics in the first luminance range $Z_1$ is -1 in the graph illustrated in FIG. 5. Accordingly, in the first luminance range $Z_1$, the output luminance Y' is expressed by the formula Y'=$Y_{BG}$-(Y-$Y_{BG}$). As a matter of course, it is only necessary for the inclination to be negative, and the inclination may be smaller than -1 or larger than -1. Further, the luminance is not limited to linear change, and may change in a curved manner.

Further, the controller 10 calculates the luminance correction table so as to perform a second luminance correction, to the pixels belonging to a second luminance range $Z_2$, in which the luminance after the correction is changed to the saturation luminance Y regardless of the luminance before the correction. In the embodiment, as illustrated in FIG. 5, the luminance correction table having characteristics that the output luminance Y' is the saturation luminance $Y_{MAX}$ in the second luminance range $Z_2$ having the input luminance Y from the luminance $Y_{BG}$+Ys to 255 is generated. Note that, in the embodiment, the first luminance range $Z_1$ and the second luminance range $Z_2$ are continuous ranges, and the inclination of the input/output characteristics in the first luminance range $Z_1$ is -1. Thus, in the embodiment, $Y_{MAX}$ is $Y_{BG}$-Ys, but, of course, $Y_{MAX}$ is not limited to this value. According to the luminance correction table described above, since only the portion brighter than the ground color of the original can be corrected to be dark, it is possible to reduce the effect of the wrinkle without erasing the pattern.

In the embodiment, the size of the first luminance range is defined by the standard deviation Ys of the luminance histogram in the range from the luminance of the ground color of the original to the maximum value of the luminance. Therefore, in the embodiment, when the luminance is distributed in a wide range in the luminance range having the higher luminance than that of the ground color, the first luminance range becomes wider than in the case where the luminance is distributed in a narrow range. Since most of the luminance higher than that of the ground color of the original is formed by the pixel of the wrinkle, in a case where there is distribution in a wide range of the luminance in the luminance range having the higher luminance than that of the ground color, it is estimated that there are many wrinkles. Therefore, in the embodiment, a configuration in which the first luminance range is made to be wide when it is estimated that there are many wrinkles is employed. According to this configuration, it is possible to adjust the intensity of the correction according to the degree of influence of the wrinkle.

Next, the controller 10 specifies the first region and the second region by the function of the extraction section 11b (Step S300). In the embodiment, the first region and the second region are distinguished based on the gradient of the read image. Accordingly, acquiring the gradient of the read image and evaluating whether or not the gradient of each pixel is within a range defined by the first threshold value and the second threshold value that are determined in advance is equivalent to specifying whether each pixel belongs to the first region or the second region. In view of this, the controller 10 scans through the read image using each pixel of the read image as a target pixel, and calculates the gradient for each target pixel. The gradient can be identified by, for example, a luminance difference or the like of pixels including the target pixel in a predetermined range. Here, an example is assumed in which pixels in a range of two pixels on each of the upper, lower, right, and left sides of the target pixel are pixels surrounding the target pixel, and the controller 10 obtains the maximum luminance and the minimum luminance of 5×5 pixels in total, and sets the absolute value of the difference thereof as a gradient d.

In this example, the controller 10 regards a region in which the gradient d is equal to or larger than a first threshold value $d_0$+D as the first region, and regards a region in which the gradient d is equal to or smaller than a second threshold value $d_0$ as the second region. Note that, in the embodiment, in order to gradually change the reduction amount of the wrinkle at the boundary between the first region and the second region, the first region and the second region have different values.

When the gradient d of each pixel is acquired, the controller 10 corrects the luminance based on the gradient d and the luminance correction table (Step S400). In the embodiment, in order to gradually change the reduction amount of the wrinkle at the boundary between the first region and the second region, a configuration is employed in which the output luminance Y' of the luminance correction table and the input luminance Y (uncorrected luminance) are linearly combined with each other by a weight W. In other words, the controller 10 acquires the corrected luminance of each pixel by w×Y+(1−w)×Y'.

Figure 6:
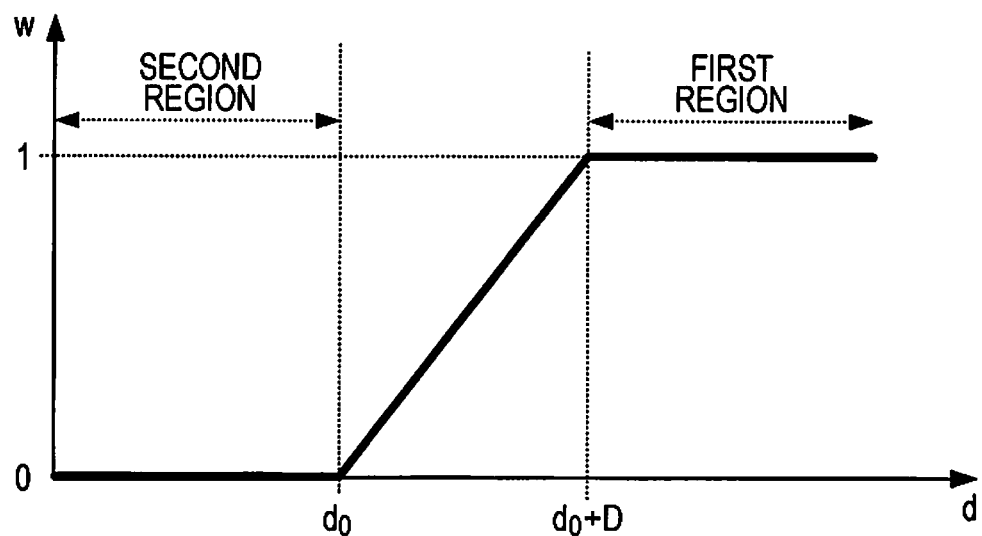
FIG. 6 is a diagram illustrating a change in a weight by a gradient.

FIG. 6 is a graph showing a change in the weight w according to d. In FIG. 6, a horizontal axis represents the gradient d, and a vertical axis represents the weight w. As shown in FIG. 6, in the second region in which the gradient is equal to or smaller than the second threshold value $d_0$, the weight w becomes 0. Accordingly, the corrected luminance in the second region becomes Y', and the output luminance Y' itself obtained by the luminance correction table becomes the corrected luminance. On the other hand, in the first region in which the gradient is equal to or larger than the first threshold value $d_0+D$, the weight w becomes 1. Therefore, the corrected luminance in the first region is equal to the luminance Y before the correction, and the luminance correction table is not applied. In a case where the gradient is larger than the second threshold value $d_0$ and smaller than the first threshold value $d_0+D$, the weight changes from 0 to 1 with the gradient increasing. Therefore, in a pixel whose gradient is in this range, the corrected luminance becomes a luminance between the luminance Y before the correction and the output luminance Y' by the luminance correction table, and the magnitude thereof changes in accordance with the weight.

Figure 7:
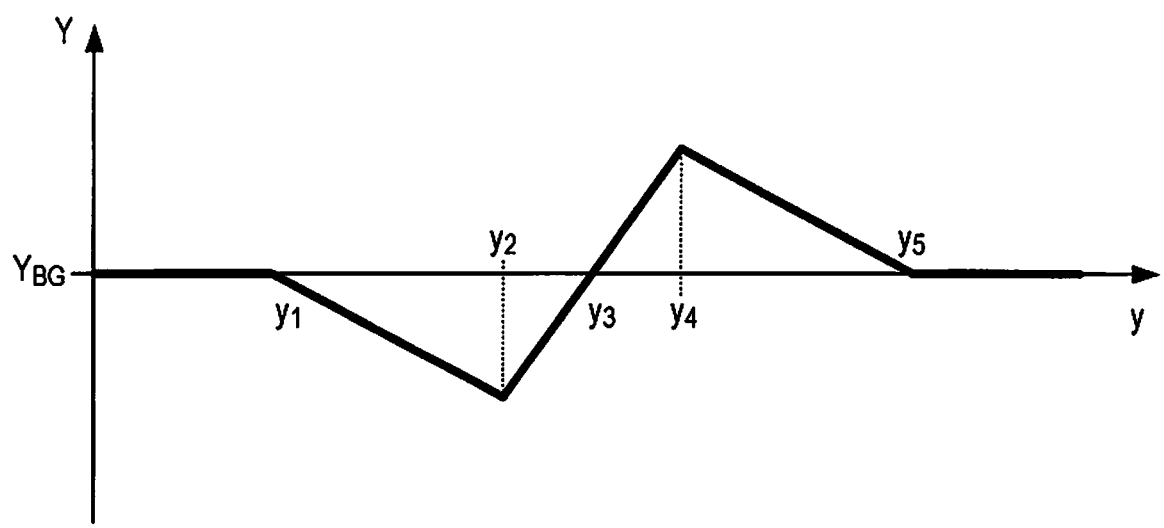
FIG. 7 is a diagram illustrating a luminance of a wrinkle portion before a correction.
Figure 8:
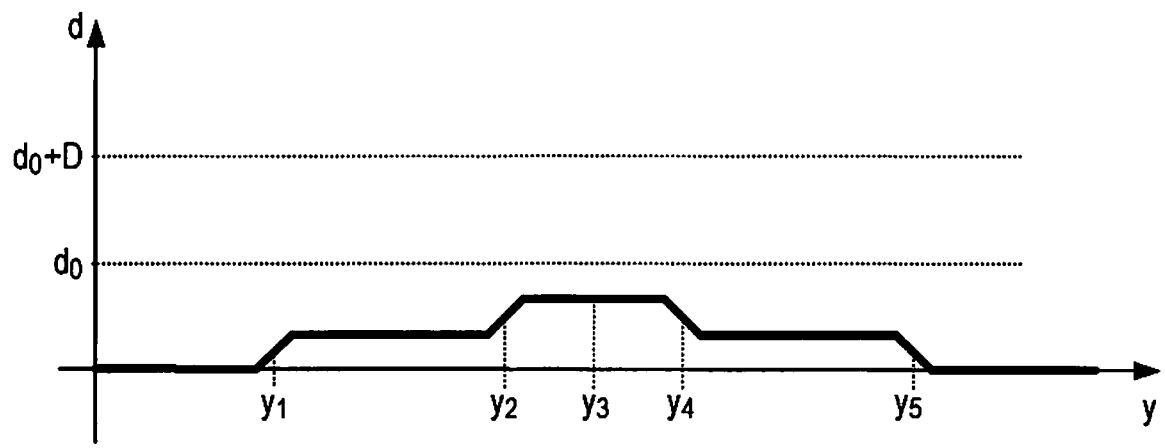
FIG. 8 is a diagram illustrating a gradient of the wrinkle portion.
Figure 9:
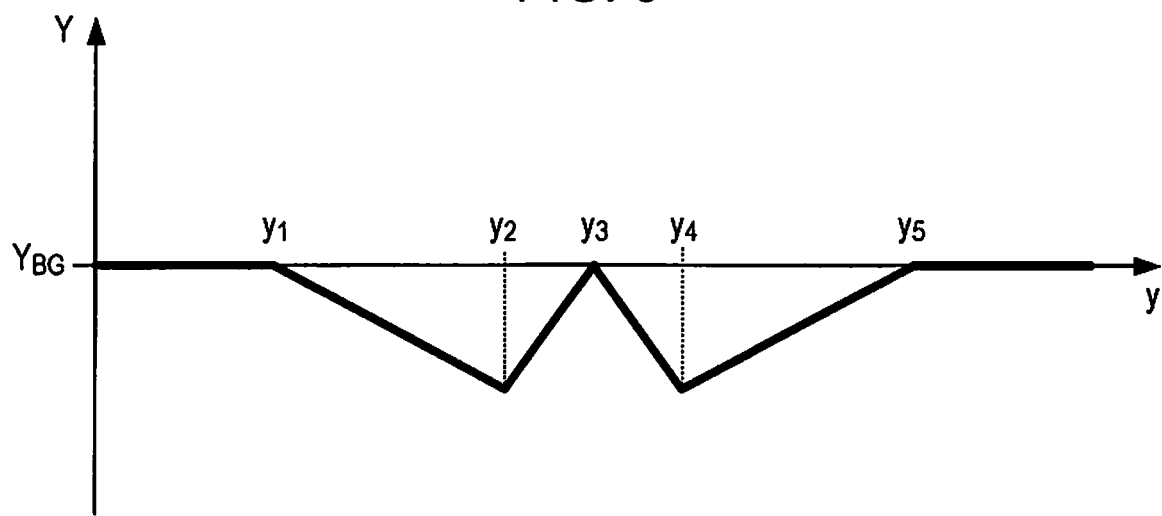
FIG. 9 is a diagram illustrating a luminance of the wrinkle portion after the correction.

FIG. 7 to FIG. 9 are explanatory views for illustrating a state of the correction in the wrinkle $C_1$ illustrated in FIG. 2 described above. FIG. 7 illustrates a luminance before the correction in the pixel constituting the wrinkle $C_1$, FIG. 8 illustrates a gradient d of the pixel illustrated in FIG. 7, and FIG. 9 illustrates a corrected luminance. In each of the drawings, a horizontal axis represents a position in the y direction (sub scanning direction), and positions given the same reference numeral ($y_1$, or the like) indicate the same position. In the example illustrated in FIG. 7, the luminance in regions in the negative direction of the y-axis from a position $y_1$ and in the positive direction of the y-axis from a position $y_5$ is the luminance $Y_{BG}$ of the ground color. In addition, in the example illustrated in FIG. 7, the pixels at the position $y_1$ to a position $y_2$ are darker than the ground color, and become gradually darker toward the positive direction of the y-axis. The pixels at the position $y_2$ to a position $y_3$ are darker than the ground color, and become gradually brighter toward the positive direction of the y-axis. The pixels at the position $y_3$ to a position $y_4$ are brighter than the ground color, and become gradually brighter toward the positive direction of the y-axis. The pixels at the positions $y_4$ to $y_5$ are brighter than the ground color, and become gradually darker toward the positive direction of the y-axis.

When the gradient is calculated in the pixels having such a luminance change, the gradient becomes nonzero when a pixel whose luminance is changed is included around each pixel. Further, the larger the change in the luminance with respect to the position is, the larger the gradient becomes. Therefore, as illustrated in FIG. 8, a state in which, while the gradient gradually changes around the position $y_1$, the position $y_2$, the position $y_4$, and the position $y_5$, a section in which the gradient is substantially constant exists between the position $y_1$ and the position $y_2$, a section in which the gradient is substantially constant exists between the position $y_2$ and the position $y_4$ (before and after the position $y_3$), and a section in which the gradient is substantially constant exists between the position $y_4$ and the position $y_5$ is obtained.

In FIG. 8, the first threshold value $d_0+D$ and the second threshold value do are illustrated, and as illustrated in FIG. 8, the gradient of the wrinkle $C_1$ is equal to or smaller than the second threshold value $d_0$. Accordingly, the entire region of the wrinkle $C_1$ is the second region. In general wrinkles, although the brightness and darkness are formed, the gradient of the brightness and darkness is smaller than the gradient formed by the object such as the character, and in the embodiment, the gradient of the brightness and darkness due to the wrinkle is equal to or smaller than the second threshold value $d_0$. It is to be noted that the second threshold value $d_0$ is preferably set such that the gradient of the brightness and darkness in a typical wrinkle becomes equal to or smaller than the second threshold value $d_0$, and for example, a configuration or the like in which the second threshold value do is statistically determined can be employed.

As described above, since the entire region of the wrinkle $C_1$ illustrated in FIG. 7 is the second region, the weight becomes 0 in the formula w×Y+(1−w)×Y' indicating the corrected luminance, and the output luminance Y' of the luminance correction table becomes the corrected luminance. In the luminance correction table, as illustrated in FIG. 5, only the luminance higher than the luminance $Y_{BG}$ of the ground color of the original is corrected. Accordingly, in the example illustrated in FIG. 7, the correction is performed on the pixels in the range from the position $y_3$ to the position $y_5$. FIG. 9 illustrates an example of a luminance after the correction, and the correction is performed such that the portion brighter than the ground color of the original becomes darker than the ground color of the original. As a result, the portion brighter than the ground color formed by the wrinkle disappears, and the effect of the wrinkle can be reduced.

Figure 10:
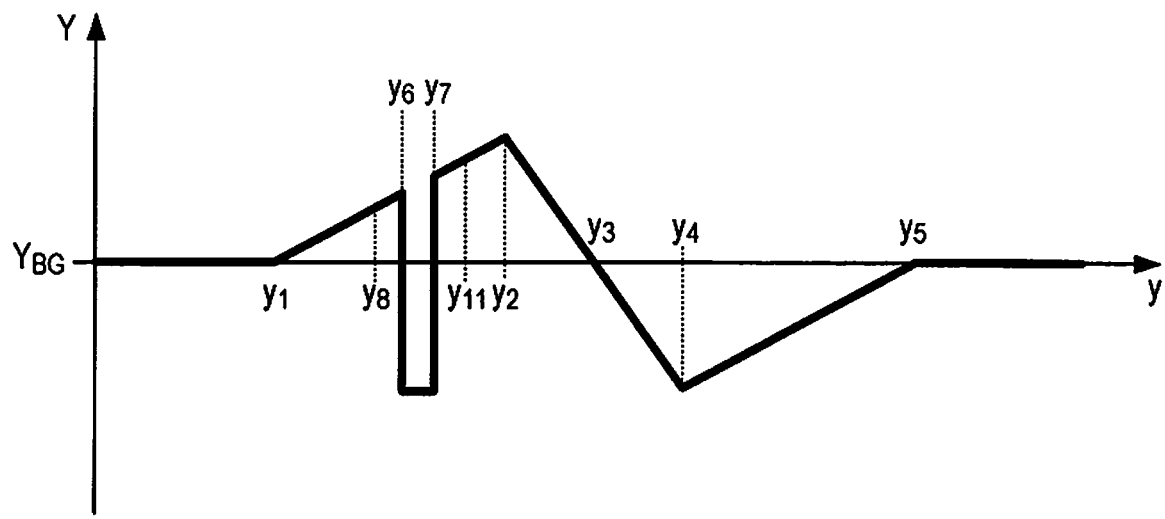
FIG. 10 is a diagram illustrating a luminance of the wrinkle portion including a character before the correction.
Figure 11:
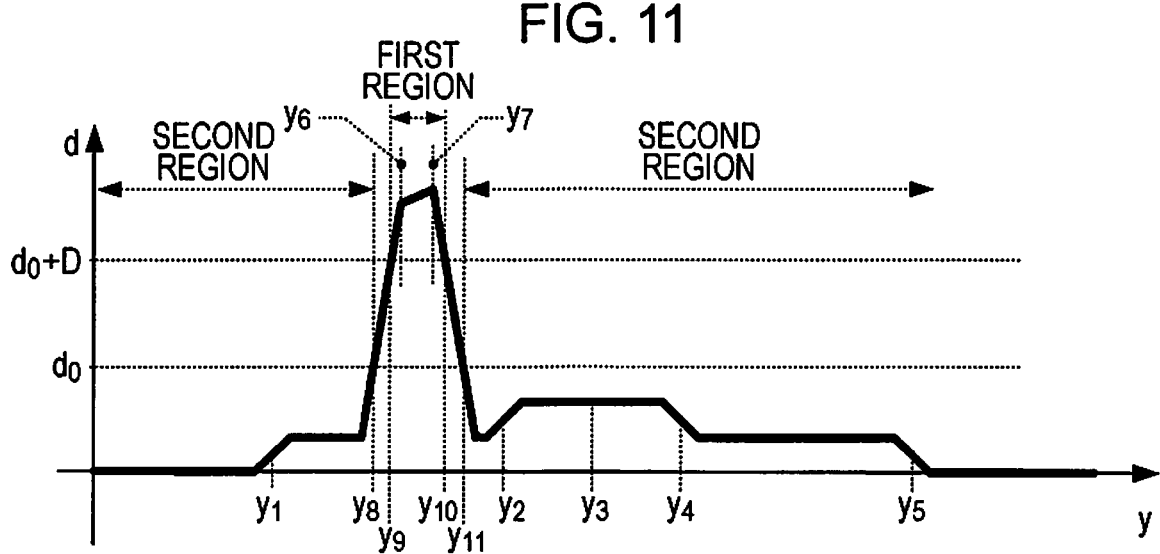
FIG. 11 is a diagram illustrating a gradient of the wrinkle portion including the character.
Figure 12:
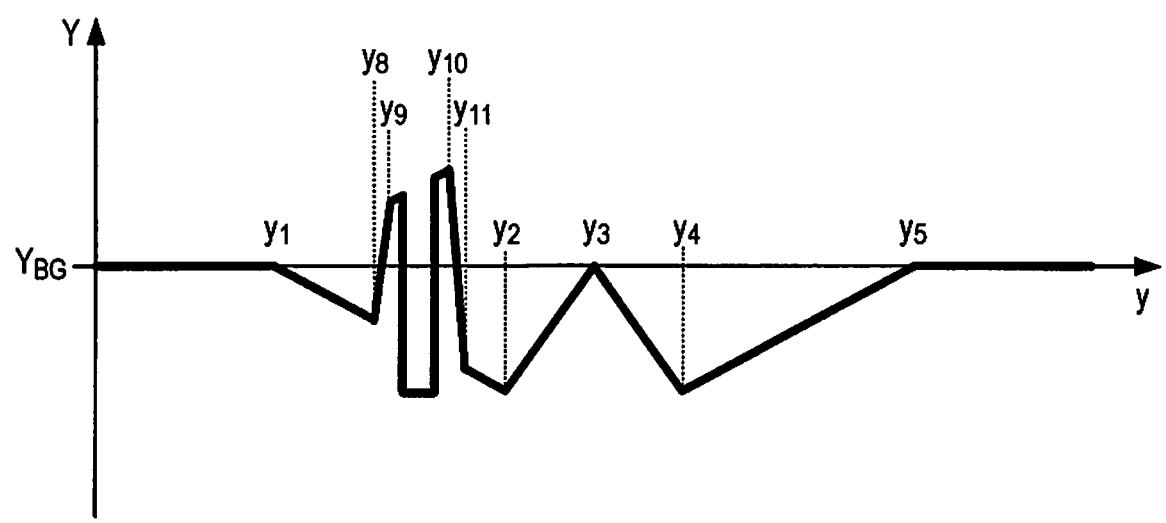
FIG. 12 is a diagram illustrating a luminance of the wrinkle portion including the character after the correction.

FIG. 10 to FIG. 12 are explanatory views for illustrating a state of the correction in the wrinkle $C_2$ illustrated in FIG. 2 described above. FIG. 10 illustrates a luminance before the correction in the pixel constituting the wrinkle $C_2$, FIG. 11 illustrates a gradient d of the pixel illustrated in FIG. 10, and FIG. 12 illustrates a corrected luminance. In each of the drawings, a horizontal axis represents a position in the y direction (sub scanning direction), and positions given the same reference numeral ($y_1$, or the like) indicate the same position. In the example illustrated in FIG. 10, the luminance in regions in the negative direction of the y-axis from the position $y_1$ and in the positive direction of the y-axis from the position $y_5$ is the luminance $Y_{BG}$ of the ground color. In addition, in the example illustrated in FIG. 10, the pixels at the position $y_1$ to a position $y_6$ are brighter than the ground color, and become gradually brighter toward the positive direction of the y-axis. The pixels at the position $y_6$ to a position $y_7$ are pixels constituting the character, and are constituted by pixels darker than the ground color. The pixels at the positions $y_7$ to $y_2$ are brighter than the ground color, and become gradually brighter toward the positive direction of the y-axis. The pixels at the positions $y_2$ to $y_3$ are brighter than the ground color, and become gradually darker toward the positive direction of the y-axis. The pixels at the positions $y_3$ to $y_4$ are darker than the ground color, and become gradually darker toward the positive direction of the y-axis. The pixels at the positions $y_4$ to $y_5$ are darker than the ground color, and become gradually brighter toward the positive direction of the y-axis.

When the gradient is calculated in the pixels having such a luminance change, the gradient becomes nonzero when a pixel whose luminance is changed is included around each pixel. Further, the larger the change in the luminance with respect to the position is, the larger the gradient becomes. Since the gradient is an absolute value of the luminance difference, and the wrinkles $C_1$ and $C_2$ are different only in the unevenness being reversed and the presence or absence of a character, the gradient illustrated in FIG. 11 is almost the same as the gradient illustrated in FIG. 8 except for the periphery of the character.

On the other hand, in the periphery of the character, the gradient greatly changes. In this example, since a narrow character is assumed, when the gradient is calculated using the luminance difference existing around the target pixel, the gradient becomes equal to or larger than the first threshold value $d_0+D$ in a region including the region of the character (position $y_6$ to position $y_7$) (position $y_9$ to position $y_{10}$: $y_6$ to $y_6$, $y_7$ to $y_{10}$). Further, as the distance from the region of the character (position $y_6$ to position $y_7$) increases, the gradient becomes smaller, and the gradient becomes the second threshold value $d_0$ at a position $y_8$ and a position $y_{11}$.

Accordingly, in this example, the pixels at the position $y_9$ to position $y_{10}$ are the pixels in the first region, the pixels on the negative direction side of the y-axis from the position $y_8$ are the pixels in the second region, and the pixels on the positive direction side of the y-axis from the position $y_{11}$ are the pixels in the second region. As described above, in the wrinkle $C_2$ illustrated in FIG. 10, since the pixels on the negative direction side of the y-axis from the position $y_8$ and the pixels on the positive direction side of the y-axis from the position $y_{11}$ are the pixels in the second region, the weight becomes 0 in the formula $w \times Y+(1-w) \times Y'$ indicating the corrected luminance, and the output luminance Y' of the luminance correction table becomes the corrected luminance.

In the luminance correction table, as illustrated in FIG. 5, only the luminance higher than the luminance $Y_{BG}$ of the ground color of the original is corrected. Accordingly, in the example illustrated in FIG. 10, in the pixels in the range from the position $y_1$ to the position $y_8$ and the pixels in the range from the position $y_{11}$ to the position $y_3$, the output luminance Y' of the luminance correction table becomes the corrected luminance.

On the other hand, since the pixels at the position $y_9$ to the position $y_{10}$ are the pixels in the first region, the weight becomes 1 in the formula $w \times Y+(1-w) \times Y'$ indicating the corrected luminance, and the output luminance Y' of the luminance correction table is not taken into consideration. Therefore, the correction is not performed on the luminance of the pixels included in the first region.

Further, in the pixels existing between the first region and the second region, that is, in the pixels at the position $y_8$ to the position $y_9$ and the pixels at the position $y_{10}$ to the position $y_{11}$, since the gradient becomes a value between the second threshold value $d_0$ and the first threshold value $d_0+D$, the weight becomes a value of 0 to 1 in the formula $w \times Y+(1-w) \times Y'$ indicating the corrected luminance, and the adjustment by the weight is performed. Therefore, when the position in the pixels at the position $y_8$ to the position $y_9$ changes toward the positive direction of the y-axis, the luminance gradually changes from the luminance in the state in which the correction using the luminance correction table is performed to the luminance in the state in which the correction is not performed. Further, when the position in the pixels at the position $y_{10}$ to the position $y_{11}$ changes toward the positive direction of the y-axis, the luminance gradually changes from the luminance in the state in which the correction using the luminance correction table is not performed to the luminance in the state in which the correction is performed.

With the configuration described above, while reducing the effect of the wrinkle by eliminating the portion brighter than the ground color formed by the wrinkle, it is possible to maintain a contrast in the periphery of the character. Therefore, it is possible to perform the wrinkle reduction process without making the character illegible.

Next, the controller 10 converts the YUV color channels into the RGB color channels (Step S500). In other words, the embodiment is configured such that an image obtained after the correction of the read image is output through the RGB color channels. Then, the controller 10 performs a conversion inverse to step S100 on the data of each pixel obtained in step S400. It is sufficient that the conversion of the YUV color channels into the RGB color channels is performed using various techniques, and for example, the conversion can be performed by the following formulas or the like.

$G=Y-(U-127)/2-(V-127)/2$ $R=G2 \times (V-127)-1$ $B=G2 \times (U-127)-1$

Here, R is the gray scale value of the red channel after the conversion, G is the gray scale value of the green channel after the conversion, B is the gray scale value of the blue channel after the conversion, Y is the corrected luminance, and U and V are the values acquired in Step S100.

3. Other Embodiments

The above embodiment is an example for carrying out the invention, and various other embodiments can be employed. For example, a scanner according to an embodiment of the invention may be provided in a multifunction peripheral or the like which is an electronic device used for a purpose other than reading. Further, as in the above embodiment, a method which does not reduce the wrinkle in the region having the pattern on the wrinkle and reduces the wrinkle in the region having the wrinkle and no pattern can also be realized as an invention of a program, an invention of a method, and an invention of a method of generating scan data.

Further, at least some of the process of the controller 10 may be performed by a driver program or an application program of a computer connected to the scanner 1. In this case, the computer can be considered as a portion of the scanner.

Further, the above embodiment is merely an example, and an embodiment from which some of the configurations are omitted or to which other configurations is added may be employed. For example, instead of gradually changing the reduction amount of the wrinkle at the boundary between the first region and the second region, a configuration may be employed in which the controller 10 does not perform the correction in the first region and performs the correction using the luminance correction table in the second region in a situation where the first region and the second region are adjacent.

It is only necessary for the reading section to be capable of reading the original and generating the read image. In other words, in the reading section, by detecting the light from the original that is caused by the light emitted onto the original, when the wrinkle is generated on the original, the read image including the wrinkle is generated. A mode for reading the original may include various modes, and is not limited to the configuration in which the original mounted on a flatbed original platen is read as described above, and a configuration or the like in which the original transported by an ADF is read may be used.

It is only necessary for the extraction section to be capable of extracting the first region having the pattern on the wrinkle and the second region having the wrinkle and no pattern from the read image. In other words, it is only necessary to extract the second region to be subjected to the wrinkle reduction process and the first region not to be subjected to the wrinkle reduction process. It is sufficient for the pattern to be a subject to be prevented from being illegible by the wrinkle reduction process, and various portions which are distinguished from the ground color of the original by the character, the figure, and the color may constitute the pattern. As a matter of course, only those recognized as characters by OCR or the like may be used as the pattern.

A method for detecting the first region having the pattern on the wrinkle may employ various techniques other than the method of referring to the gradient as described above. For example, there may be a configuration or the like in which a region surrounded by an edge, a portion around which a sharp portion is present, a portion including a jaggy portion, or the like is detected as the first region.

It is only necessary for the processing section to be capable of switching, for each region, between the case where the wrinkle reduction process is performed and the case where the wrinkle reduction process is not performed. In the above-described embodiment, the configuration in which the reduction amount of the wrinkle is gradually changed at the boundary between the first region and the second region is employed, but a configuration in which the reduction amount of the wrinkle is not adjusted may also be assumed. In addition, various ways for changing can be employed even when in a case of changing. Note that, although the wrinkle reduction process refers to reducing the effect of the wrinkle in the image, and is typically a process of making the brightness and darkness generated against the ground color by the wrinkle inconspicuous, the wrinkle reduction may be an elimination of the wrinkle.

The ground color of the original can be specified by various known methods. For example, an appropriate value for preventing the ground color of the original from being erroneously determined may be employed as the specific luminance that is taken into consideration when specifying the ground color of the original. In other words, in the determination based on only the statistical value of the luminance histogram, when the dark portion such as the character has a large area, the portion may be erroneously determined as the ground color of the original. In general, since the ground color of the original is composed of a bright color such as white, it is possible to reduce the possibility of erroneous determination of the ground color in a case where the ground color of the original is bright, by taking the luminance histogram into consideration for a region having a higher luminance than the specific luminance. However, not only in a case of the bright color, but also when the ground color of the original is within a specific luminance range or within a specific hue range, the ground color may be acquired by the statistical value of the luminance histogram within the specific luminance range or within the specific hue range.

It is sufficient that the saturation luminance is a luminance that is recognized as the luminance of the ground color after the correction, and is set such that a portion brighter than the ground color generated by the wrinkle can be converted so as to have the luminance lower than that of the ground color after the correction. Note that, as in the above embodiment, the saturation luminance may be determined by the ground color and the first luminance range, or may be a fixed value.

In the boundary between the first region and the second region, the element which is considered when gradually changing the reduction amount of the wrinkle is not limited to the gradient. For example, a configuration or the like may be such that, at the boundary between the first region and the second region, the weight of the correction is changed in accordance with the distance from each region.

Further, the invention is also applicable as a program or a method executed by a computer. Further, the program and the method described above may be implemented as a single device or may be implemented by using components included in a plurality of devices, and may include various modes. In addition, some portions may be implemented as software and the other portions may be implemented as hardware, and various such modifications can be made as appropriate. Further, the invention is also implemented as a recording medium of a program. As a matter of course, the recording medium of the program may be a magnetic recording medium, or a magneto-optical recording medium, and the same applies to any recording medium that may be developed in the future.

What is claimed is:

1. A scanner comprising:
   a processor constituting:
      a reading section configured to read an original and generating a read image;
      a specification section configured to specify a first region having a pattern on a wrinkle and a second region having no pattern on a wrinkle in the read image; and
      a processing section configured to perform a wrinkle reduction process in which the wrinkle is not reduced in the first region of the read image and the wrinkle is reduced in the second region of the read image.

2. The scanner according to claim 1,
   wherein the wrinkle reduction process
      is a process for performing a correction on only a portion having a higher luminance than a luminance of a ground color of the original in the second region to be dark.

3. The scanner according to claim 2,
   wherein the processing section
      acquires the ground color based on a statistical value of a luminance histogram of the read image in a region having a higher luminance than a specific luminance.

4. The scanner according to claim 2,
   wherein the processing section, in the portion having the higher luminance than the luminance of the ground color,
      performs a first luminance correction in which a luminance after the correction is changed from the luminance of the ground color to a saturation luminance which is lower than the luminance of the ground color with an increase in a luminance before the correction with respect to a pixel belonging to a first luminance range including the ground color, and performs a second luminance correction in which the luminance after the correction is changed to the saturation luminance irrespective of the luminance before the correction with respect to a pixel belonging to a second luminance range which is adjacent to a high luminance side of the first luminance range.

5. The scanner according to claim 4,
wherein the processing section
widens, in a case where a luminance is distributed in a wide range in a luminance range having the higher luminance than the luminance of the ground color, the first luminance range in comparison with a case where the luminance is distributed in a narrow range.

6. The scanner according to claim 1,
wherein the processing section
gradually changes a reduction amount of the wrinkle at a boundary between the first region and the second region.

7. A method of producing scan data comprising:
reading an original and generating a read image;
specifying a first region having a pattern on a wrinkle and a second region having no pattern on a wrinkle in the read image; and
producing scan data by performing a wrinkle reduction process in which the wrinkle is not reduced in the first region of the read image and the wrinkle is reduced in the second region of the read image.

8. A non-transitory computer-readable medium with a scan control program for causing a computer to perform operations comprising:
reading an original and generating a read image;
specifying a first region having a pattern on a wrinkle and a second region having no pattern on a wrinkle in the read image; and
performing a wrinkle reduction process in which the wrinkle is not reduced in the first region of the read image and the wrinkle is reduced in the second region of the read image.

* * * * *